United States Patent [19]

Hashimoto

[11] 4,207,960
[45] Jun. 17, 1980

[54] ENGINE MOUNTING FOR MOTORCYCLES

[75] Inventor: Mashayuki Hashimoto, Iwata, Japan

[73] Assignee: Yamaha Hatsudoki Kabushiki Kaisha, Iwata, Japan

[21] Appl. No.: 958,387

[22] Filed: Nov. 7, 1978

[30] Foreign Application Priority Data

Nov. 11, 1977 [JP] Japan .............. 52-150689[U]

[51] Int. Cl.² ............................................. B60K 5/12
[52] U.S. Cl. ..................... 180/228; 180/291
[58] Field of Search ........... 180/33 A, 33 R, 64 R, 180/228, 291; 248/560, 637, 638, 613

[56] References Cited
U.S. PATENT DOCUMENTS 3,542,146  11/1970  Hooper et al. ............... 180/33 A

FOREIGN PATENT DOCUMENTS

| 801375 | of 1951 | Fed. Rep. of Germany | 180/33 A |
| 1010877 | of 1952 | France | 180/33 R |
| 196760 | of 1923 | United Kingdom | 180/33 R |
| 216522 | of 1924 | United Kingdom | 180/33 R |
| 598754 | of 1948 | United Kingdom | 180/33 A |

Primary Examiner—John J. Love
Assistant Examiner—Donn McGiehan
Attorney, Agent, or Firm—Dennis P. Clarke

[57] ABSTRACT

Motorcycle having a frame and an engine which is mounted on the frame through a pair of laterally spaced engine mounting plates. The plates are attached at their upper ends to the opposite sides of the engine and at their lower ends to brackets which are extending downwards from the frame. The engine mounting plates have flexibility or resiliency in lateral direction so that engine vibrations can be absorbed to a satisfactory extent. Further, the arrangement is effective to lower the position of the engine while providing a satisfactory resiliency.

3 Claims, 3 Drawing Figures

ENGINE MOUNTING FOR MOTORCYCLES

The present invention relates to motorcycles and more particularly to means for mounting engines on motorcycle frames.

In conventional motorcycles, engine mounting means includes resilient rubber mounts which are adapted to be placed between the engines and the frames for absorbing vibrations produced in the engines. However, experiences have proved that such known engine mounting means are not satisfactory in absorbing engine vibrations.

It is therefore an object of the present invention to provide engine mounting means which is effective to absorb lateral engine vibrations.

Another object of the present invention is to provide simple but reliable engine mounting means for motorcycles.

According to the present invention, in order to accomplish the above and other objects, the motorcycle frame is provided with plate means which has a flexibility in lateral direction of the motorcycle and the engine is mounted on the frame through the plate means. In the motorcycle of the present invention, the engine is thus mounted with a lateral flexibility so that the engine vibration can adequately absorbed by the engine mount means and siding confortability of the motorcycle can be improved.

According to a preferable aspect of the present invention, the engine is carried by the plate means at the front lower side thereof whereas it is mounted at the rear lower side through conventional means on the frame. The plate means may be comprised of a pair of laterally spaced plates which are connected at the upper ends thereof with the opposite sides of the engine crankcase. The lower end of each plate may be connected with a bracket which extends downwardly from the frame. The arrangement is effective in lowering the position of the engine while providing an adequate lateral flexibility of the engine mount means.

The above and other objects and features of the present invention will become apparent from the following descriptions of a preferred embodiment taking reference to the accompanying drawings, in which.

Figure 1:
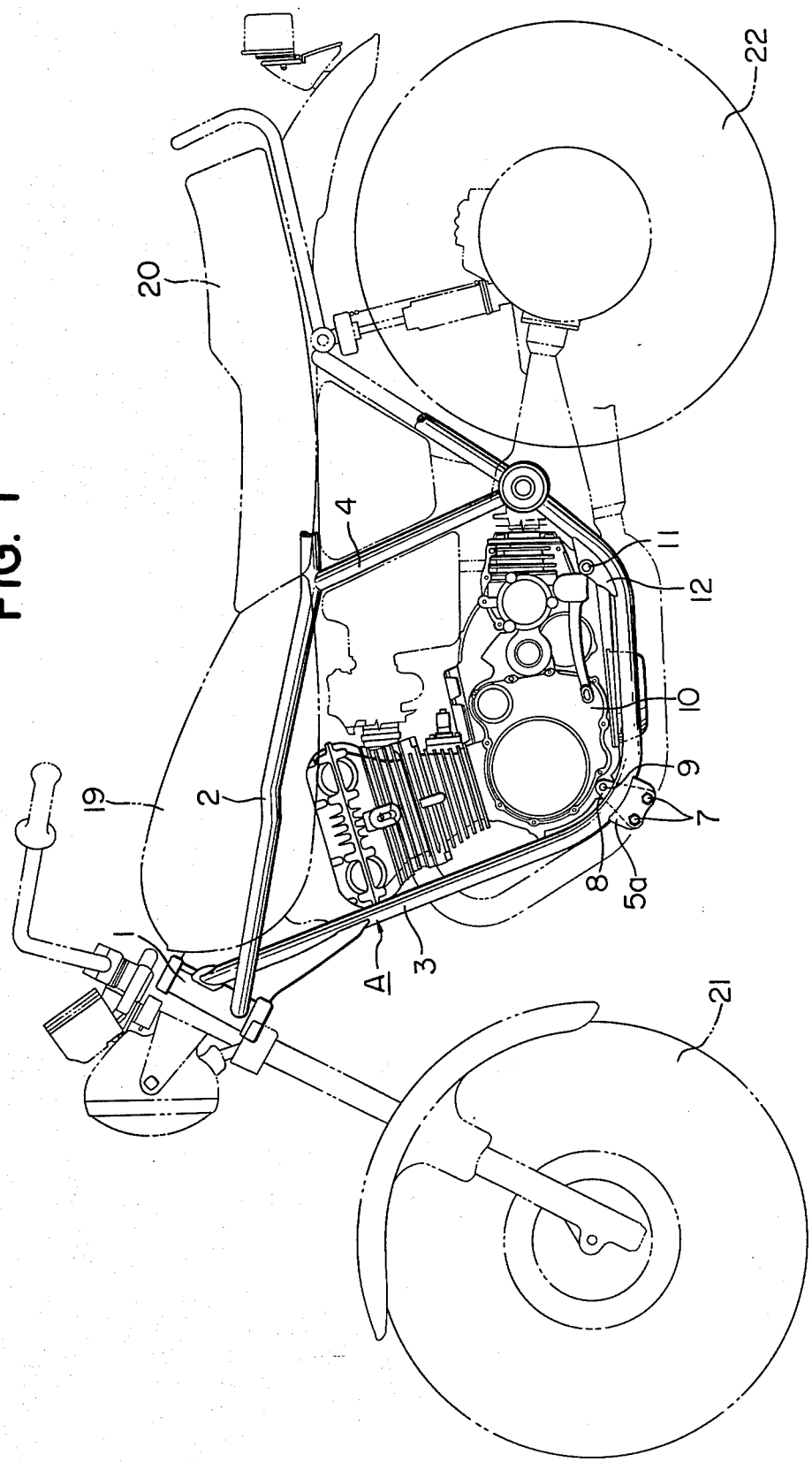
FIG. 1 is a side view of a motorcycle having engine mounts in accordance with one embodiment of the present invention.

Referring to the drawings, particularly to FIG. 1, there is shown a motorcycle having a frame A comprised of a head pipe 1 and a pair of laterally spaced main pipes 2 which are extending rearwardly from the head pipe 1. The frame A further includes a pair of laterally spaced down tubes 3 which are secured such as by welding to the head pipe 1 and respectively have front portions rear and downwardly extending from the head pipe 1 and rear portions extending rearwardly from the front portions. The main pipes 2 and the down tubes 3 are connected together at the rear end portions thereof by means of support pipes 4.

Figure 2:
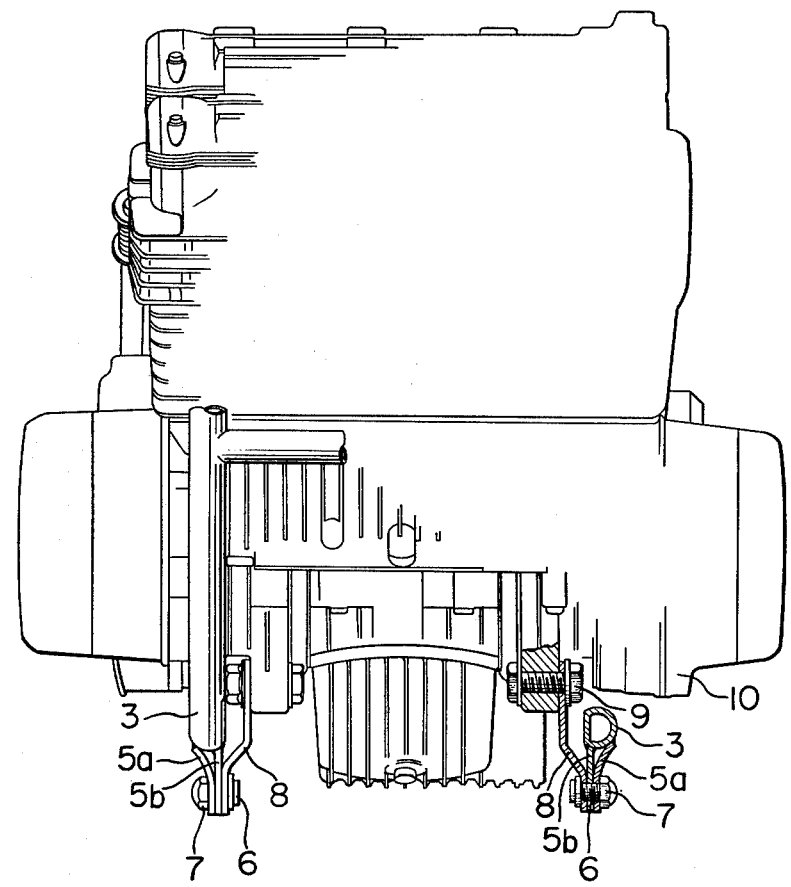
FIG. 2 is a front view showing the front engine mount.

Referring now to FIG. 2 as well as FIG. 1, each of the down tubes 3 carries a bracket comprised of a pair of bracket plates 5a and 5b which are welded at the upper ends to the lower surface of the down tube 3 at the junction between the front and rear portions thereof. The bracket plates 5a and 5b extend downwardly from the down tube and brought into contact with each other at the lower ends so as to form a substantially V-shaped cross-sectional configuration.

At the lower end of the bracket, an engine mount plate 8 is connected at its lower end by means of a bolt 6 and a nut 7. The plate 8 is constituted by a relatively thin steel sheet and has an inwardly and upwardly extending lower portion and an upwardly extending upper portion. An engine 10 is carried by the plate 8 by being connected at each side of the front lower portion thereof to the upper end of the plate 8 through a bolt 9. As shown in FIG. 2, the down tube 3 may be flattened at the side facing to the plate 8 so as to avoid any interference between the tube 3 and the plate 8. Thus, it will be noted that the engine 10 is mounted on the frame A at the opposite sides of the front portion through the paired mounting plates 8.

Figure 3:
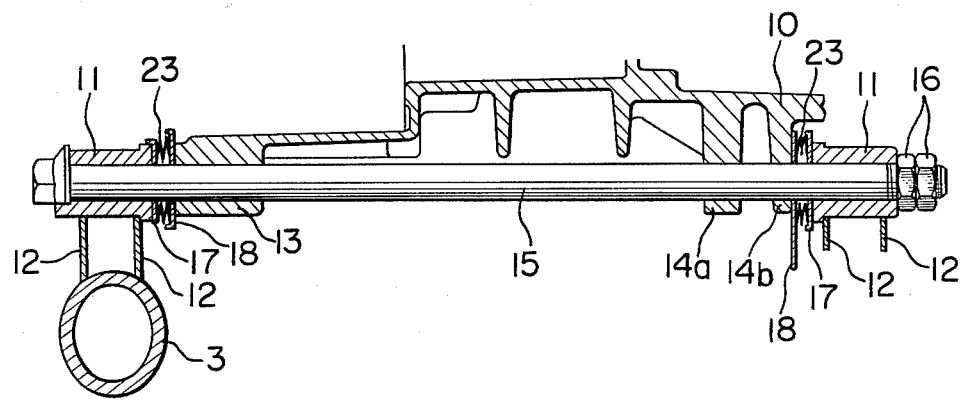
FIG. 3 is a fragmentary sectional view showing the rear engine mount.

At a rearward portion of each down tube 3, there is provided an upwardly projecting bracket 12 which has a boss 11 welded to the upper end thereof as shown in FIG. 3. At one side, the engine 10 is provided in rear lower portion with a boss 13 which is adapted to be aligned with the boss 11 on one of the down tubes 3. At the other side of the engine 10, there are formed a pair of downwardly extending projections 14a and 14b which are adapted to be aligned in lateral direction with the boss 11 on the other of the down tubes 3. A laterally extending bolt 15 is passed through the bosses 11 and 13 and the projections 14a and 14b and fastened by nuts 16. A damper assembly comprising a resilient damper 23 attached at the opposite ends to discs 17 and 18 is interposed between the bosses 11 and 13. Similar damper assembly is also interposed between the other boss 11 and the projection 14b on the engine 10.

As conventional in the art, the motorcycle has a fuel tank 19, a seat 20, front and rear wheels 21 and 22.

In the above described arrangement, the engine mounting plates 8 provide a lateral flexibility or resiliency so that the engine is mounted with a low natural frequency in lateral direction. Thus, it is possible to absorb the engine vibrations to a satisfactory extent. Further, the illustrated arrangement of the engine mounting plates is preferable in that the position of the engine can be lowered while providing an adequate lateral resiliency of the engine mounts.

The invention has thus been shown and described with reference to a specific embodiment, however, it should be noted that the invention is in no way limited to the details of the illustrated structures but changes and modifications may be made without departing from the scope of the appended claims.

I claim:

1. Motorcycle comprising a frame and an engine mounted thereon through engine mounting means, said engine mounting means including front mounting means comprised of a pair of laterally spaced mounting plates having upper ends respectively connected to opposite sides of the front portion of the engine and lower ends to bracket means extending downwardly from said frame, and rear mounting means comprised of laterally resilient mount means for mounting a rear lower portion of the engine on the frame.

2. Motorcycle in accordance with claim 1 in which said bracket means includes a pair of mounting brackets respectively connected with the mounting plates, each of said mounting brackets comprising a pair of bracket plates having upper ends connected to the frame at laterally spaced positions and lower ends connected to the lower end of the associated mounting plate.

3. Motorcycle in accordance with claim 1 in which said rear mounting means includes a pair of laterally resilient dampers disposed at opposite sides of the rear lower portion of the engine and a laterally extending bolt extending through the rear lower portion of the engine and the resilient dampers to mount the engine on the frame through said dampers.

* * * * *